United States Patent
Boss et al.

(10) Patent No.: US 8,521,547 B2
(45) Date of Patent: Aug. 27, 2013

(54) MECHANIC CERTIFICATION TRACKING VALIDATOR

(75) Inventors: Gregory J. Boss, American Fork, UT (US); Peter G. Finn, Brampton (CA); Rick A. Hamilton, II, Charlottesville, VA (US); Brian M. O'Connell, Cary, NC (US); James W. Seaman, Falls Church, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 12/261,367

(22) Filed: Oct. 30, 2008

(65) Prior Publication Data

US 2010/0114426 A1    May 6, 2010

(51) Int. Cl.
*G06Q 10/00* (2012.01)

(52) U.S. Cl.
USPC ............................................. 705/1.1

(58) Field of Classification Search
USPC ............................................. 705/1.1
See application file for complete search history.

(56) References Cited

U.S. PATENT DOCUMENTS

| 5,061,915 | A * | 10/1991 | Murphy | 340/426.12 |
|---|---|---|---|---|
| 5,445,347 | A | 8/1995 | Ng | |
| 6,275,157 | B1 | 8/2001 | Mays et al. | |
| 6,839,710 | B2 | 1/2005 | Dabbish et al. | |
| 6,853,303 | B2 * | 2/2005 | Chen et al. | 340/573.1 |
| 7,137,001 | B2 | 11/2006 | Dabbish et al. | |
| 7,184,866 | B2 | 2/2007 | Squires et al. | |
| 7,196,621 | B2 | 3/2007 | Kochis | |
| 7,469,171 | B2 * | 12/2008 | Tefft et al. | 701/29 |
| 2002/0026537 | A1 * | 2/2002 | Schlabach et al. | 710/1 |
| 2004/0003230 | A1 * | 1/2004 | Puhl et al. | 713/155 |
| 2004/0015278 | A1 * | 1/2004 | Gordon et al. | 701/33 |
| 2004/0229730 | A1 * | 11/2004 | Ainsworth et al. | 482/8 |
| 2005/0015501 | A1 * | 1/2005 | Kaplan et al. | 709/228 |
| 2008/0021717 | A1 * | 1/2008 | Kaartinen et al. | 705/1 |
| 2008/0021718 | A1 * | 1/2008 | Kaartinen et al. | 705/1 |
| 2009/0030747 | A1 * | 1/2009 | Smith et al. | 705/5 |
| 2010/0114426 | A1 * | 5/2010 | Boss et al. | 701/35 |

OTHER PUBLICATIONS

Lampe, Institute for Pervasive Computing, Department of Computer Science, ETH Zurich, The Potential of RFID for Moveable Asset Management, Institute of Technology Management, University of St. Gallen, pp. 1-4.

* cited by examiner

*Primary Examiner* — Matthew L. Brooks
(74) *Attorney, Agent, or Firm* — Patrick J. Daugherty; Driggs, Hoggs, Daugherty & Del Zoppo Co., LPA

(57) ABSTRACT

The present invention provides a system, method, and program product for tracking mechanic certification information. In one instance, information related to the certification of the mechanic is received and compared with stored authorized mechanic certification information. If a match is found, indicia indicating that the mechanic is an authorized mechanic is stored with the type of service.

23 Claims, 3 Drawing Sheets

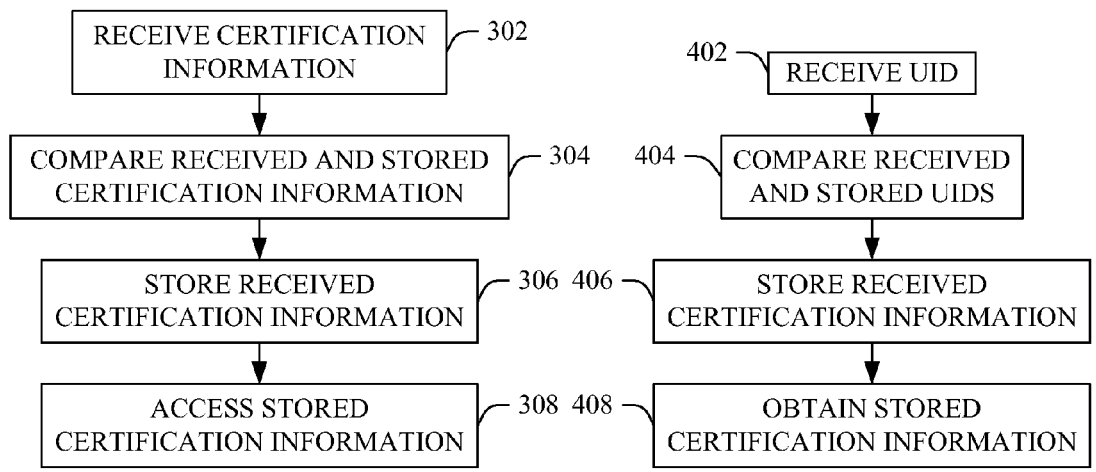
FIGURE 3
FIGURE 4
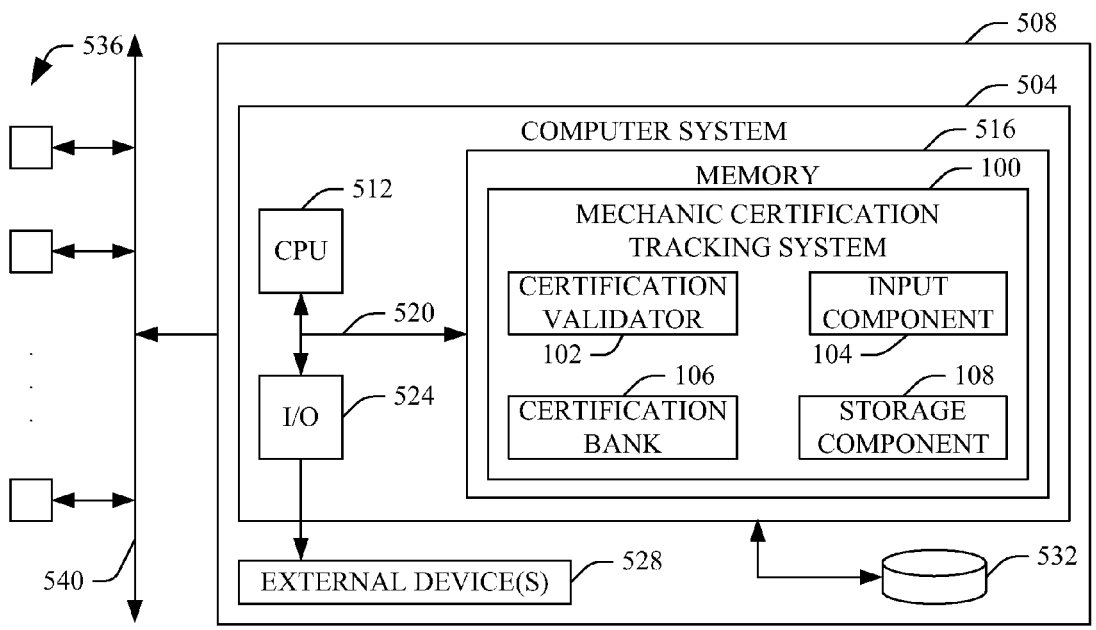
FIGURE 5

MECHANIC CERTIFICATION TRACKING VALIDATOR

FIELD OF THE INVENTION

The present invention generally relates to vehicle maintenance and, more particularly, to a method, system, and program product for tracking the certification of a mechanic(s) servicing a vehicle.

BACKGROUND OF THE INVENTION

A vehicle, for example an automobile, typically requires preventive and/or corrective maintenance at some point in time during its lifetime. By way of example, a manufacturer of a vehicle may recommend changing the oil, flushing the coolant system, rotating the tires, etc. after a corresponding mileage milestone is reached. In another example, a tail light, a tire, the brake pads, etc. may need to be replaced after burning out, going flat, wearing down, etc. Often, the owner of a vehicle has a mechanic perform maintenance on the vehicle.

In some instances, a vehicle warranty may require that a particular service be performed by a certified or factory authorized mechanic. If the service is performed by an unauthorized mechanic and results in damage to the vehicle, the guarantor of the warranty may inadvertently provide remuneration for invalid claims. To mitigate such, a guarantor may attempt to detect service by an unauthorized mechanic through manually inspecting the parts of a vehicle and/or identifying indications of service, and comparing such to service records produced by a claimant that identify the service performed and the mechanic who performed the service.

With one approach, the guarantor may look for components that appear newer than surrounding parts. With this approach, an individual can potentially visually detect a new part by comparing the amount and covering percentage of dirt or other contaminants on the outside of a part to that of surrounding parts. With another approach, the guarantor can compare the serial number of all vehicle parts to those that were in the vehicle when it was sold. Upon finding a discrepancy, the guarantor may request that a claimant provide documentation identifying the mechanic who performed a repair or service.

Unfortunately, these approaches require physical inspection of the vehicle. In some instances, physical inspection may not reveal some new components. Furthermore, some repairs or service work do not require new components. In addition, used parts may be put back in place prior to vehicle inspection. Furthermore, some components may not become dirty or rapidly become dirty. Moreover, internal engine components cannot be easily inspected.

SUMMARY OF THE INVENTION

In general, the present invention provides a method, system, and program product for tracking the certification of a mechanic servicing a vehicle. In one instance, this may be accomplished by receiving information related to the certification of the mechanic, including a mechanic certification, a location of the service station, and/or a service ID, and comparing such information with stored information indicative of an authorized mechanic, service station, service station location, and/or service ID. If a match is found, the received information and/or indicia that indicates that the service was performed by an authorized party is stored along with the type of service and/or other service related information. The stored information can be retrieved to determine whether a particular service performed on the vehicle was performed by an authorized mechanic pursuant to the warranty, expectations of the owner, and/or potential purchaser of the vehicle.

In one aspect, a system for tracking mechanic certification information for a vehicle includes a certification validator that determines whether received mechanic certification information matches stored authorized mechanic certification information, and a storage component that stores a signal indicative of whether a mechanic corresponding to the received certification information is an authorized mechanic.

In another aspect, a method for tracking mechanic certification information for a vehicle includes receiving first information indicative of a certification of a mechanic performing a service on the vehicle, generating a signal indicative of whether the certification matches an authorized mechanic certification, and storing indicia indicative of whether the certification matches the authorized mechanic certification.

In another aspect, a method includes producing computer executable program code, storing the code on a computer readable medium, and providing the program code to be deployed and executed on a computer system. The program code comprising instructions which, when executed on the computer system, cause the computer system to receive information indicative of a certification of a mechanic performing a service on the vehicle, generate a signal indicative of whether the certification matches an authorized mechanic certification, and store indicia indicative of whether the certification matches the authorized mechanic certification.

In another aspect, a method for deploying an application for tracking mechanic certification includes providing a computer infrastructure being operable to sense received information indicative of a certification of a mechanic performing a service on the vehicle, generate a signal indicative of whether the certification matches an authorized mechanic certification, and store indicia indicative of whether the certification matches the authorized mechanic certification.

BRIEF DESCRIPTION OF THE DRAWINGS

These and other features of this invention will be more readily understood from the following detailed description of the various aspects of the invention taken in conjunction with the accompanying drawings in which:

FIG. 3 illustrates a method for tracking the certification of a mechanic(s) serving a vehicle.

FIG. 4 illustrates a method for tracking the certification of a mechanic(s) serving a vehicle.

FIG. 5 illustrates an exemplary computerized implementation of a system for tracking the certification of a mechanic(s) serving a vehicle.

Figure 1:
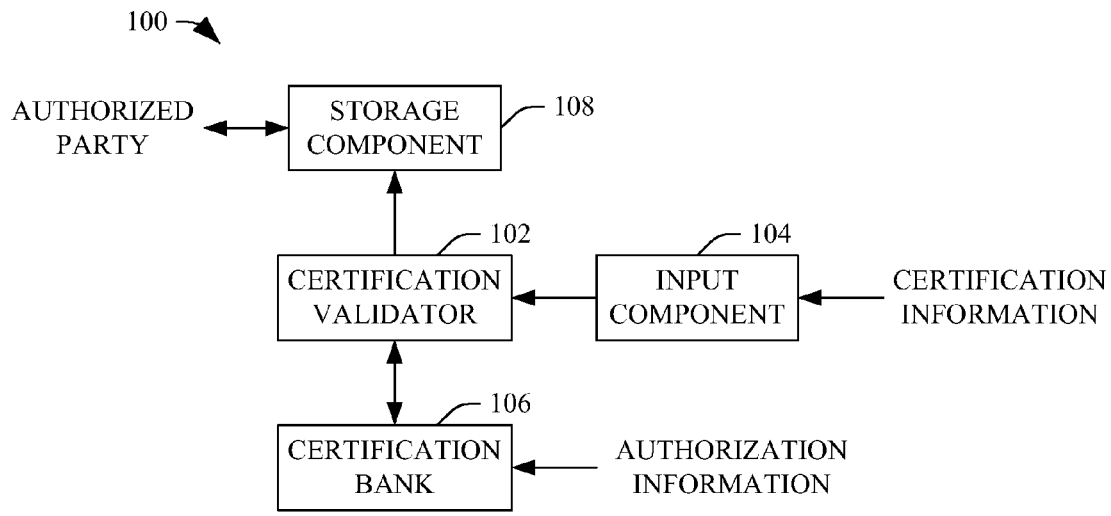
FIG. 1 illustrates a system for tracking the certification of a mechanic(s) serving a vehicle.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:

I. General Description
II. Computerized Implementation

I. General Description

Conventionally, a guarantor cannot readily ascertain whether a service on a vehicle was performed by a certified or authorized mechanic. The present invention provides a system, method, and program product tracking the certification of a mechanic(s) servicing a vehicle. The tracked data is retrievable and can be used to determine whether a particular service was performed by a mechanic authorized to perform the service under the warranty and/or for other purposes, such as for an owner or potential purchaser of the vehicle to verify service and service history records meet expectations.

Initially referring to FIG. 1, a system 100 for tracking the certification of a mechanic(s) servicing a vehicle is illustrated. The system 100 may reside in and/or operate in conjunction with a vehicle such as a car, a truck, a motorcycle, a boat, or the like. For example, the system 100 may be part of or operate in conjunction with the vehicle's computer, computing system, and/or various components within one or more sub-systems of the vehicle. Portions of the system 100 may also be located external from the vehicle, for example, in a computer, a mobile computing device, a cell phone, a component of a network, etc. at a service station, the owner's house, etc.

The system 100 includes a certification validator 102 that validates or determines whether received mechanic certification information matches stored authorized certification information. The certification validator 102 receives certification information that is provided to an input component 104 via wireless and/or wired communication channels. The received certification information may include information about a mechanic, a service station, a service, and the like, such as a service unique identifier that is indicative of an authorized mechanic. The certification validator 102 compares the received certification information with certification information stored in a certification bank 106.

The certification bank 106 may be part of a database(s), a table(s) of a database, etc. located in stationary or removable portable memory. The certification bank 106 stores authorized certification information provided by the government, a manufacturer of the vehicle, an owner of the vehicle, a third party, and/or other authorized party. As an example, the certification bank 106 may include information regarding an authorized mechanic(s), service station(s), service request(s), service ID(s), and the like. In one instance, such information is obtained from a common manufacturer database. Such a database may be relational and include data relative to authorized service centers, certified mechanics, location data, and/or other relevant data. The certification bank 106 may optionally store information indicative of prohibited mechanic(s), service station(s), etc. This information may relate to a mechanic that had his certification withdrawn by the manufacturer, a service station that did not qualify as an authorized service station, etc.

The certification validator 102 stores the received certification information in a storage component 108. The stored certification information may be stored along with indicia indicative of whether the received certification information matches any of the stored authorized certification information, a signal indicative of whether the mechanic is authorized to perform a service on the vehicle, a service performed on the vehicle, etc. The storage component 108 may be part of or include a service tracking system that stores information such as a service history. In such instance, the indicia and/or certification information can be stored with indicia indicative of corresponding service performed on the vehicle.

An authorized party of interest may access the storage component 108 and obtain and/or otherwise view the stored service and certification information. In one instance, the authorized party includes a guarantor of a warranty of the vehicle, a potential purchaser of the vehicle, the owner of the vehicle, and/or the like. The stored information allows the authorized party to determine whether a service that was performed on the vehicle was performed by an authorized mechanic. Thus, a guarantor of a warranty can use the information stored in the storage component 108 to determine whether a particular service performed on the vehicle was performed in accordance with the warranty. The warranty information may also be stored in the storage component 108. As such, the stored information may indicate whether a particular service performed on the vehicle was performed in accordance with the warranty.

Figure 6:
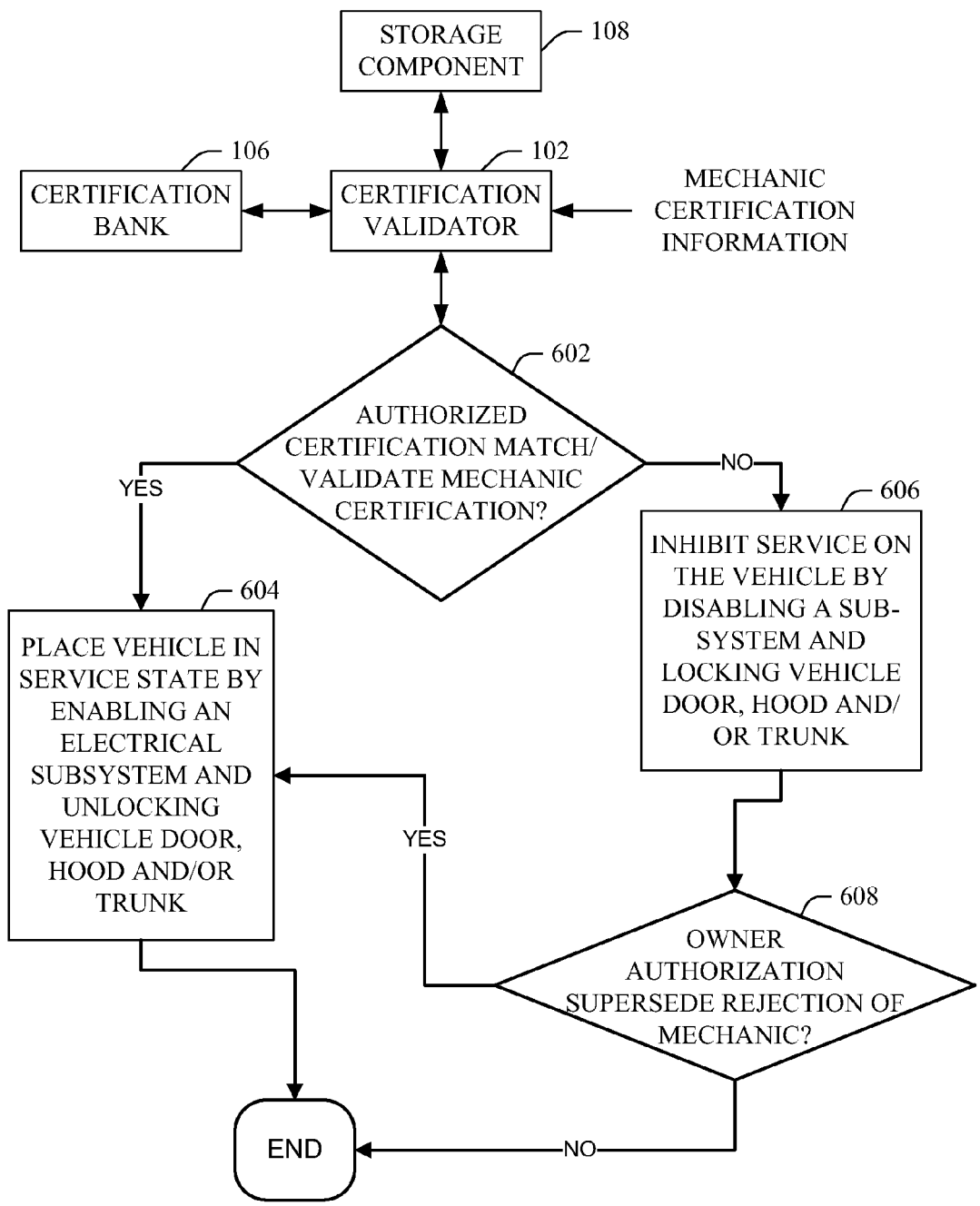
FIG. 6 is a block diagram illustration of an embodiment according to the present invention that tracks mechanic certification information for a vehicle.

FIG. 6 illustrates one instance or embodiment of method or system for tracking mechanic certification information for a vehicle. If at 602 the certification validator 102 matches (validates) certification information received for a mechanic with an authorized certification in the certification bank 106, the certification validator 102 facilitates service on a vehicle by the mechanic by placing the vehicle in a service state at 604. For instance, finding a match may result in the certification validator 102 (or another component such as the vehicle's computer) generating one or more signals at 604 that result in the doors, hood, and/or trunk unlocking, disarming of an alarm, activating visual indicators, executing diagnostic and/or other software via the vehicle computer, etc. If instead at 602 the certification validator 102 is unable to match (validate) the received certification information with an authorized certification in the certification bank 106, the certification validator 102 prevents or inhibits service at 606. For instance, when a match is not found at 602, the certification validator 102 (or another component such as the vehicle's computer) may generate one or more signals that inhibit service on the vehicle at 606 by locking the doors, hood, and/or trunk, activating and/or sounding an alarm, disabling the ignition or other electrical sub-system of the vehicle, etc.

It is to be appreciated that a mechanic may be associated with one or more certifications from one or more sources. As such, multiple different certifications may be stored in the storage component 108. Where a certification is used to determine whether a mechanic will perform a service, certification preferences stored in the storage component 108 may be used to reconcile discrepancies between different sources of authorized certification information. For example, a mechanic authorized by a vehicle manufacturer may not be authorized by the owner of the vehicle, an automobile association, state regulation, etc.

The certification preferences allow the owner of the vehicle and/or other individual to set a hierarchy of authorization information sources to reconcile any discrepancies therebetween. For example, in the embodiment of FIG. 6, as a function of the certification preferences at 608, the certification validator 102 enables a vehicle owner authorization of a mechanic to supersede a manufacturer rejection of the mechanic via the stored mechanic certification authorization, which supersedes automobile authorization, etc. and facilitates service on the vehicle by the mechanic by placing the vehicle in the service state at 604. In this example, the validator 102 would use a mechanic authorized by the owner even if the mechanic was not authorized by another authorization source. Any or all certification approvals, rejections, and/or unknowns can be stored in the storage component 108.

In one non-limiting implementation, the input component 104 includes one or more radio frequency identification (RFID) readers or the like variously located throughout the vehicle. The readers may be positioned in the vehicle so that the aggregate coverage by the one or more RFID readers covers at least the components subject to mechanic certifications conditions under the warranty. The mechanic certification information can be provided to the system via a RFID tag or transponder for the mechanic. The RFID tag could take on many forms. For example, in one instance the tag may be part of an article of the mechanic or service station such as a bracelet or an identification badge worn by the mechanic, embedded in the mechanics sewn-on name tag, affixed to one or more selective tools owned by the authorized service center, attached to an entry way to a mechanic's service area, etc.

The RFID tag can be a passive tag, an active tag, or a semi-passive tag. With a passive tag, the reader(s) emits an electromagnetic field that induces an electrical current in an antenna of the tag. The electrical current provides power for the tag, for example, for powering an integrated circuit in the tag, which invokes the tag to emit or transmit the certification information stored in the tag (e.g., in Electrically Erasable Programmable Read-Only Memory, or EEPROM, etc.) via the antenna. As noted above, such information may include received mechanic certification information for the mechanic such as indicia indicative of a type of certification(s) of the mechanic. Other information may include the mechanic's name, a service station's name, a service station's location, a service station identifier, an employer, an indication of the number of years the mechanic has been certified, a service rating for the mechanic, a service level of the mechanic, etc.

With an active tag, the RFID tag includes an internal power source such as a battery, a solar cell, etc. that powers the integrated circuit, which broadcasts the certification information for reception by an authorized reader tuned to a broadcast frequency. Alternatively or additionally, the RFID tag may be powered from the battery of the vehicle. The RFID tag may also be semi-passive in that an internal battery or the vehicle's battery may provide power to activate the tag, but the field provided by the reader invokes the broadcast of the certification information.

It is to be appreciated that the RFID tag or other portable certification information providing apparatus may be employed within a system that facilitates preventing an individual other than the certified mechanic from using the tag or apparatus. For instance, the RFID tag may be part of a bracelet, anklet, or the like, wherein opening and/or closing the bracelet, anklet, or the like deactivates and/or activates tag. For example, when the mechanic arrives at work and puts on and closes the bracelet, the tag may be activated to begin emitting certification information or to be susceptible to be invoked by an electromagnetic field produced by a RFID reader. When the bracelet is opened, the tag may be deactivated so that it does not emit certification information.

When the mechanic is not at work, the bracelet, or the like can be stored in a secure location such as under lock and key at the service station and/or otherwise lock, for example, via an access code or the like. The tag may also be configured to sound an alarm if removed from the service station, regardless of whether the bracelet or the like is activated to emit certification information or not. Other approaches are also contemplated herein. For example, the RFID tag may work in connection with a system that tracks a mechanic's hours and/or activity, a key for accessing vending machines, bathrooms, etc. a timer that activates the tag based on the mechanic's work schedule, etc.

In another non-limiting example, the input component 104 includes a global positioning system (GPS) receiver. The GPS receiver can receive signal indicative of a location of a service station, wherein the location of the service station is indicative of the certification of a mechanic employed at the service station, service station location information from one or more global navigational systems such as a satellite navigational system, and/or other information. In this example, the certification validator 102 compares the received service station location information with authorized service station locations stored in the certification bank 106. The authorized service station locations may be mapped to authorized service stations and/or mechanics.

In one instance, finding a matching location indicates that one or more mechanics at the service station is authorized to perform service on the vehicle. Otherwise, the service station is unauthorized. In this example, the service location and/or indicia indicating whether the service station is authorized may be stored along with indicia indicative of a corresponding type of service performed, as well as other information related to the service performed. As such, the location information is used to determine whether a mechanic, namely, one employed at the service station, is authorized to perform service on the vehicle.

It is to be appreciated that the certification validator 102 may determine whether a service station is an authorized service station before, during, or after the service is performed. In addition, the stored authorized service location and/or other certification information may be uploaded to the manufacturer or a trusted third party, and compared thereby to locations of authorized service stations. The results can be uploaded and/or downloaded and stored in the storage component 108.

Figure 2:
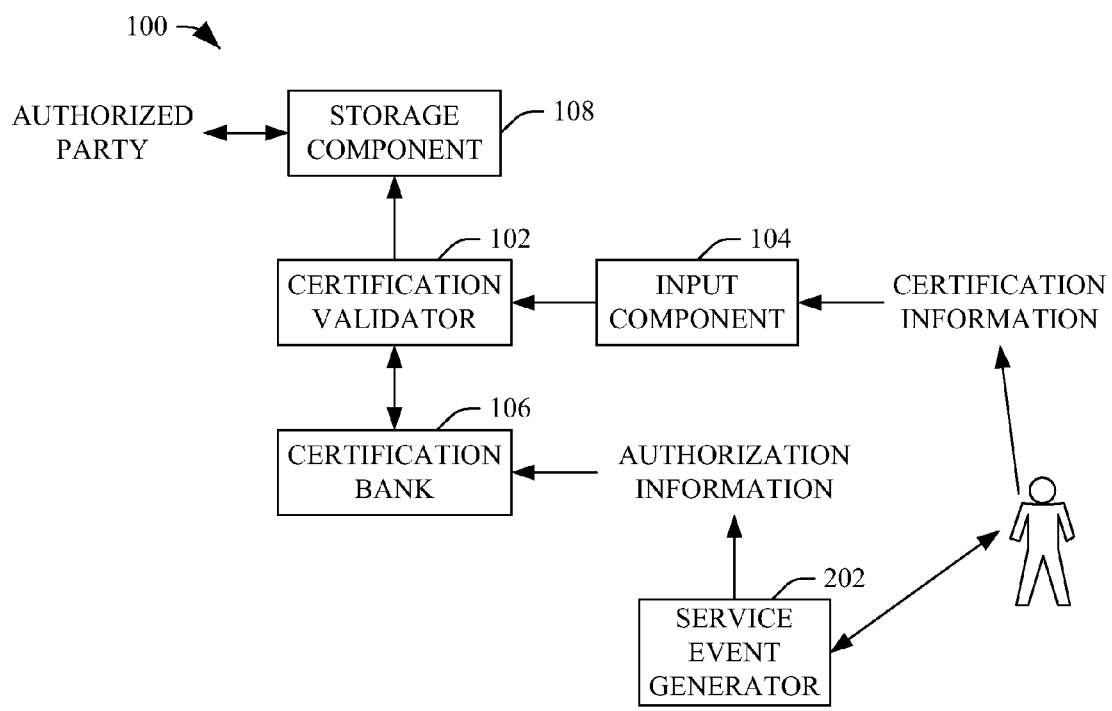
FIG. 2 illustrates a system for tracking the certification of a mechanic(s) serving a vehicle.

In another instance, the mechanic provides the certification information to the input component 104 via a wire and/or wireless device when servicing a vehicle. FIG. 2 illustrates a non-limiting example of such a system. As shown, a party interacts with a service event generator 202. The service event generator 202 can generate a service unique identifier for authorized mechanics. The received service unique identifier can be compared with a stored service unique identifier to determine whether the mechanic is an authorized mechanic. The stored information can part of a service history for the vehicle that is stored in the vehicle.

The service event generator 202 can be a variety of devices, including but not limited to an automated telephone system, an automated email system, a transaction-based web site, etc. Such interaction can be through a wire and/or wireless mouse, keyboard, and/or digital pen, a touch screen, a computing device such as a personal data assistant, a cell phone, etc., audible tones, and the like. The party provides information such as a mechanic ID, a service station ID, the Vehicle Identification Number (VIN), a type of service, and/or other information. In response, the service event generator 202 generates a code such as a unique identifier (UID) for use with the system 100. In one instance, the UID includes a unique integer derived from the mechanic ID, VIN number, other mechanic input information, the time, a random seed, and/or other information.

As shown, the UID is stored in the certification bank 106 as well as provided to the mechanic. Before performing any maintenance on the vehicle, the mechanic provides the UID to the input component 104. In this example, the input component 104 may be part of a second generation on-board diagnostic interface, a newly designed device that interfaces with the service tracking system, etc., and/or include a touch-screen display or other user interface. Once the UID is entered, the certification validator 102 determines whether the received UID matches a UID stored in the certification bank 106. If a match is found, indicia indicating such is stored along with the UID and/or the type of service in the storage component 108. The UID may also be used to obtain information related to the service from the storage component 108.

FIG. 3 illustrates a method for tracking the certification of a mechanic(s) serving a vehicle. At 302, certification information including certification information related to the certification of a mechanic and/or a service station is received. Such information may include various information about the mechanic and/or service station, including a certification number, a name, a location, etc. At 304, the received certification information is compared with stored authorized certification information. The authorized information may include information uploaded or downloaded thereto, for example, by the owner of the vehicle, the mechanic, the manufacturer, a trusted third party, or the like. At 306, the received certification information and/or indicia indicative of whether the received certification information matched any authorized information is stored along with information indicative of the type of service performed At 308, an authorized party such as a guarantor of a warranty for the vehicle can obtain the stored service information. The stored information provides information indicative of whether a service was performed by an authorized mechanic, pursuant to the warranty.

FIG. 4 illustrates another method for tracking the certification of a mechanic(s) serving a vehicle. At 402, a UID is received. As noted above, a mechanic or other party may request that a service UID, and such request may include information such as a mechanic ID, a service station ID, the VIN number, a type of service, and/or other information. The UID is stored and provided to the mechanic. At 404, the UID is compared with stored UIDs. Similarly, to the above-noted method, the stored information may include information uploaded or downloaded thereto. At 406, the received UID and/or indicia indicative of whether the received UID matched any of the authorized UIDs is stored along with indicia indicative of the type of service performed. At 408, an authorized party such as a guarantor of a warranty for the vehicle can obtain the stored service information. The stored information provides information indicative of whether a service was performed by an authorized mechanic, pursuant to the warranty, or pursuant to the expectations of the owner or potential purchaser of the vehicle.

In another embodiment, a method for tracking mechanic certification information for a vehicle includes receiving first information indicative of a certification of a mechanic performing a service on the vehicle, generating a signal indicative of whether the certification matches an authorized mechanic certification, and storing indicia indicative of whether the certification matches the authorized mechanic certification in the vehicle. In one instance, the indicia is stored with information indicative of a type of service performed. In another instance, the method further includes generating a service history that includes the service and the indicia. In yet another instance, the method further includes using the stored indicia to determine whether the service was performed by an authorized person pursuant to the manufacturer's warranty. In still another instance, the method further includes determining vehicle warranty compliance based on the stored indicia.

In another embodiment, a method includes obtaining authorized mechanic certification information from a plurality of different information sources and using an information source priority to resolve authorization conflicts between the sources. The method may further include comparing the first information with authorized mechanic certification information local to the vehicle by a computing system of the vehicle or remote from the vehicle by the manufacturer of the vehicle or a trusted third party. The method may further include disabling at least one electrical sub-system of the vehicle when the signal indicates that the mechanic is unauthorized to perform the service on the vehicle.

In another embodiment, a method includes producing computer executable program code, storing the code on a computer readable medium, and providing the program code to be deployed and executed on a computer system. In one instance, the program code comprises instructions which, when executed on the computer system, cause the computer system to: receive information indicative of a certification of a mechanic performing a service on the vehicle, generate a signal indicative of whether the certification matches an authorized mechanic certification, and store indicia indicative of whether the certification matches the authorized mechanic certification.

In another embodiment, a method for deploying an application for tracking mechanic certification information includes providing a computer infrastructure being operable to: receive information indicative of a certification of a mechanic performing a service on the vehicle, generate a signal indicative of whether the certification matches an authorized mechanic certification, and store indicia indicative of whether the certification matches the authorized mechanic certification.

II. Computerized Implementation

Referring now to FIG. 5, an exemplary computerized implementation includes a computer system 504 deployed within a computer infrastructure 508 such as one existing in a vehicle as described above. This is intended to demonstrate, among other things, that the present invention could be implemented within a network environment (e.g., the Internet, a wide area network (WAN), a local area network (LAN), a virtual private network (VPN), etc.), or on a stand-alone computer system.

In the case of the former, communication throughout the network can occur via any combination of various types of communication links. For example, the communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, computer infrastructure 608 is intended to demonstrate that some or all of the components of implementation could be deployed, managed, serviced, etc. by a service provider who offers to implement, deploy, and/or perform the functions of the present invention for others.

As shown, the computer system 504 includes a processing unit 512, a memory 516, a bus 520, and input/output (I/O) interfaces 524. Further, the computer system 504 is shown in communication with external I/O devices/resources 528 and storage system 532. In general, the processing unit 512 executes computer program code, such as the code to implement various components of the system 100, which is stored in memory 516 and/or storage system 532. It is to be appreciated that two or more, including all, of these components may be implemented as a single component.

While executing computer program code, the processing unit 512 can read and/or write data to/from the memory 516, the storage system 532, and/or the I/O interfaces 524. The bus 520 provides a communication link between each of the components in computer system 504. The external devices 528 can comprise any devices (e.g., keyboard, pointing device, display, etc.) that enable a user to interact with computer system 504 and/or any devices (e.g., network card, modem, etc.) that enable computer system 504 to communicate with one or more other computing devices.

The computer infrastructure 508 is only illustrative of various types of computer infrastructures for implementing the invention. For example, in one embodiment, computer infrastructure 508 comprises two or more computing devices (e.g., a server cluster) that communicate over a network to perform the various process steps of the invention. Moreover, computer system 504 is only representative of various possible computer systems that can include numerous combinations of hardware.

To this extent, in other embodiments, computer system 504 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively.

Moreover, the processing unit 512 may comprise a single processing unit, or be distributed across one or more processing units in one or more locations, e.g., on a client and server. Similarly, the memory 516 and/or the storage system 532 can comprise any combination of various types of data storage and/or transmission media that reside at one or more physical locations.

Further, I/O interfaces 524 can comprise any system for exchanging information with one or more of the external device 528. Still further, it is understood that one or more additional components (e.g., system software, math co-processing unit, etc.) not shown in FIG. 5 can be included in computer system 504. However, if computer system 504 comprises a handheld device or the like, it is understood that one or more of the external devices 528 (e.g., a display) and/or the storage system 532 could be contained within computer system 504, not externally as shown.

The storage system 532 can be any type of system (e.g., a database) capable of providing storage for information under the present invention. To this extent, the storage system 532 could include one or more storage devices, such as a magnetic disk drive or an optical disk drive. In another embodiment, the storage system 532 includes data distributed across, for example, a local area network (LAN), wide area network (WAN) or a storage area network (SAN) (not shown). In addition, although not shown, additional components, such as cache memory, communication systems, system software, etc., may be incorporated into computer system 504.

Shown in the memory 516 of computer system 504 is the mechanic certification tracking system 100, which includes the certification validator 102, the input component 104, the certification bank 106, and the storage component 108. In another implementation, these components, including all of the components, can be a single component. These components perform the functions discussed above. More particularly, the certification validator 102 compares certification information received by the input component 104 with authorized certification information stored in the certification bank 106, and stores the results in the storage component 104 along with corresponding service type information. In the illustrated embodiment, the system 100 communicates with external entities 536 such as another computing system, an RFID tag, a tracking system, another vehicle, a service station computer, other apparatuses external to the vehicle, etc. over a path 540, which may be wired (as shown) or wireless.

While shown and described herein as a method and a system, it is understood that the invention further provides various alternative embodiments. For example, in one embodiment, the invention provides a computer-readable/useable medium that includes computer program code to enable a computer infrastructure to track mechanic certification. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 516 (FIG. 5) and/or the storage system 532 (FIG. 5) (e.g., a fixed disk, a read-only memory, a random access memory, a cache memory, etc.).

In another embodiment, the invention provides a business method that performs the process steps of the invention on a subscription, advertising, and/or fee basis. That is, a service provider could offer to manage the mechanic certification tracking system 100. In this case, the service provider can create, maintain, support, etc., a computer infrastructure, such as the computer infrastructure 508 (FIG. 5) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing the mechanic certification tracking system 100. In this case, a computer infrastructure, such as computer infrastructure 508 (FIG. 5), can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 504 (FIG. 5), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A system in a vehicle for tracking mechanic certification information for the vehicle, comprising:
   a certification validator that:
      determines whether mechanic certification information received for a mechanic is validated by stored authorized mechanic certification information;
      if determined that the mechanic certification information is validated by the stored authorized mechanic certification information, facilitates service on a vehicle by the mechanic by placing the vehicle in a service state for executing diagnostic software via a vehicle computer, and by generating a signal that causes unlocking of at least one of a door, a hood, and a trunk of the vehicle;
      if determined that the mechanic certification information is not validated by the stored authorized mechanic certification information:
         inhibits service on the vehicle by the mechanic by disabling at least one electrical sub-system of the vehicle and by generating a signal that causes locking of at least one of the vehicle door, hood, and trunk; and
         enables a vehicle owner authorization of the mechanic to supersede a manufacturer rejection of the mechanic via the stored authorized mechanic certification information and facilitate the service on the vehicle by the mechanic by placing the vehicle in the service state for executing the diagnostic software via the vehicle computer, and by generating the signal that causes the unlocking of at least one of the vehicle door, hood, and trunk; and
   a storage component of the vehicle that stores a signal from the certification validator that is indicative of a service performed on the vehicle by the mechanic and whether the mechanic is validated by the stored authorized mechanic certification information to perform the service or is authorized to perform the service on the vehicle by the superseding vehicle owner authorization.

2. The system of claim 1, wherein the signal is stored along with at least one of the received certification information or a service performed on the vehicle.

3. The system of claim 2, wherein the received mechanic certification information includes one or more of certification indicia, a mechanic's name, a service station's name, a service station's location, and a service identifier.

4. The system of claim 3, further including at least one radio frequency identifier (RFID) reader that receives the mechanic certification information from an RFID tag.

5. The system of claim 4, wherein the RFID tag is part of one or more of an article of the mechanic or a service station at which the mechanic works.

6. The system of claim 5, wherein the article is one or more of clothing, an identification badge of the mechanic, or a bracelet worn by the mechanic.

7. The system of claim 3, further including at least one global positioning system (GPS) receiver that receives a signal indicative of a location of a service station.

8. The system of claim 7, wherein the location of the service station is indicative of the certification of a mechanic employed at the service station.

9. The system of claim 3, further including an input component that receives a service unique identifier that is indicative of an authorized mechanic.

10. The system of claim 1, further including a service event generator that generates a service unique identifier for authorized mechanics, wherein a received service unique identifier is compared with a stored service unique identifier to determine whether the mechanic is an authorized mechanic.

11. The system of claim 1, wherein the stored information is part of a service history for the vehicle that is stored in the vehicle.

12. The system of claim 1, wherein the system operates in conjunction with a computer of the vehicle.

13. The system of claim 1, wherein the system is part of a computing system of the vehicle.

14. A method for tracking mechanic certification information for a vehicle, comprising:
   receiving by a processing unit information indicative of a certification of a mechanic performing a service on a vehicle;
   the processing unit generating a signal indicative of whether the certification is validated by stored authorized mechanic certification information;
   if determined that the mechanic certification information is validated by the stored authorized mechanic certification information, the processing unit facilitating service on a vehicle by the mechanic by placing the vehicle in a service state for executing diagnostic software via a vehicle computer, and by generating a signal that causes an unlocking of at least one of a door, a hood, and a trunk of the vehicle;
   if determined that the mechanic certification information is not validated by the stored authorized mechanic certification information, the processing unit:
      inhibits service on the vehicle by the mechanic by disabling at least one electrical sub-system of the vehicle and generating a signal that causes a locking of at least one of the vehicle door, hood, and trunk; and
      enables a vehicle owner authorization of the mechanic to supersede a manufacturer rejection of the mechanic via the stored authorized mechanic certification information and facilitate the service on the vehicle by the mechanic by placing the vehicle in the service state for executing the diagnostic software via a vehicle computer, and by generating the signal that causes the unlocking of at least one of the vehicle door, hood, and trunk; and
   the processing unit storing indicia indicative of a service performed on the vehicle by the mechanic and whether the mechanic is validated by the stored authorized mechanic certification information to perform the service or is authorized to perform the service on the vehicle by the superseding vehicle owner authorization.

15. The method of claim 14, wherein the indicia is stored with information indicative of a type of service performed.

16. The method of claim 15, further including generating a service history that includes the service and the indicia.

17. The method of claim 16, further including using the stored indicia to determine whether the service was performed by an authorized person pursuant to the manufacturer's warranty.

18. The method of claim 16, further including determining vehicle warranty compliance based on the stored indicia.

19. The method of claim 14, further including:
   obtaining authorized mechanic certification information from a plurality of different information sources; and
   using an information source priority to resolve authorization conflicts between the sources.

20. The method of claim 14, further including comparing the first information with authorized mechanic certification information local to the vehicle by a computing system of the vehicle or remote from the vehicle by the manufacturer of the vehicle or a trusted third party.

21. The method of claim 14, wherein the disabling the at least one electrical sub-system of the vehicle comprises disabling an ignition of the vehicle.

22. An article of manufacture, comprising:
a computer readable tangible storage medium
having computer readable program code embodied therewith, the program code comprising instructions which, when executed on a computer system, cause the computer system to:
receive information indicative of a certification of a mechanic performing a service on a vehicle;
generate a signal indicative of whether the certification is validated by stored authorized mechanic certification information;
if determined that the mechanic certification information is validated by the stored authorized mechanic certification information, facilitate service on a vehicle by the mechanic by placing the vehicle in a service state for executing diagnostic software via a vehicle computer, and generate a signal that causes an unlocking of at least one of a door, a hood, and a trunk of the vehicle;
if determined that the mechanic certification information is not validated by the stored authorized mechanic certification information:
inhibit service on the vehicle by the mechanic by disabling at least one electrical sub-system of the vehicle and generating a signal that causes a locking of at least one of the vehicle door, hood, and trunk; and
enable a vehicle owner authorization of the mechanic to supersede a manufacturer rejection of the mechanic via the stored authorized mechanic certification information and facilitate the service on the vehicle by the mechanic by placing the vehicle in the service state for executing the diagnostic software via the vehicle computer, and by generating the signal that causes the unlocking of at least one of the vehicle door, hood, and trunk; and store indicia indicative of a service performed on the vehicle by the mechanic and whether the mechanic is validated by the stored authorized mechanic certification information to perform the service or is authorized to perform the service on the vehicle by the superseding vehicle owner authorization.

23. A method for deploying an application for tracking mechanic certification information, comprising:
providing a computer infrastructure that:
receives information indicative of a certification of a mechanic performing a service on a vehicle;
generates a signal indicative of whether the certification is validated by stored authorized mechanic certification information;
if determined that the mechanic certification information is validated by the stored authorized mechanic certification information, facilitates service on the vehicle by the mechanic by placing the vehicle in a service state for executing diagnostic software via a vehicle computer, and generates a signal that causes an unlocking of at least one of a door, a hood, and a trunk of the vehicle;
if determined that the mechanic certification information is not validated by the stored authorized mechanic certification information:
inhibits service on the vehicle by the mechanic by disabling the at least one vehicle electrical sub-system and generating a signal that that-causes a locking of at least one of the vehicle door, hood, and trunk; and
enables a vehicle owner authorization of the mechanic to supersede a manufacturer rejection of the mechanic via the stored authorized mechanic certification information and facilitate the service on the vehicle by the mechanic by placing the vehicle in the service state for executing the diagnostic software via the vehicle computer, and by generating the signal that causes the unlocking of at least one of the vehicle door, hood, and trunk; and
stores indicia indicative of a service performed on the vehicle by the mechanic and whether the mechanic is validated by the stored authorized mechanic certification information to perform the service or is authorized to perform the service on the vehicle by the superseding vehicle owner authorization.

\* \* \* \* \*